May 24, 1938.  G. KNAPP  2,118,250
COVERING MATERIAL
Filed Jan. 20, 1933
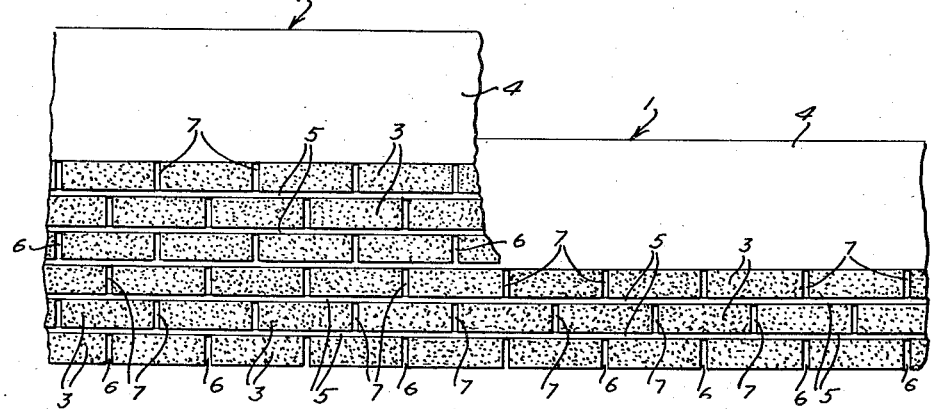
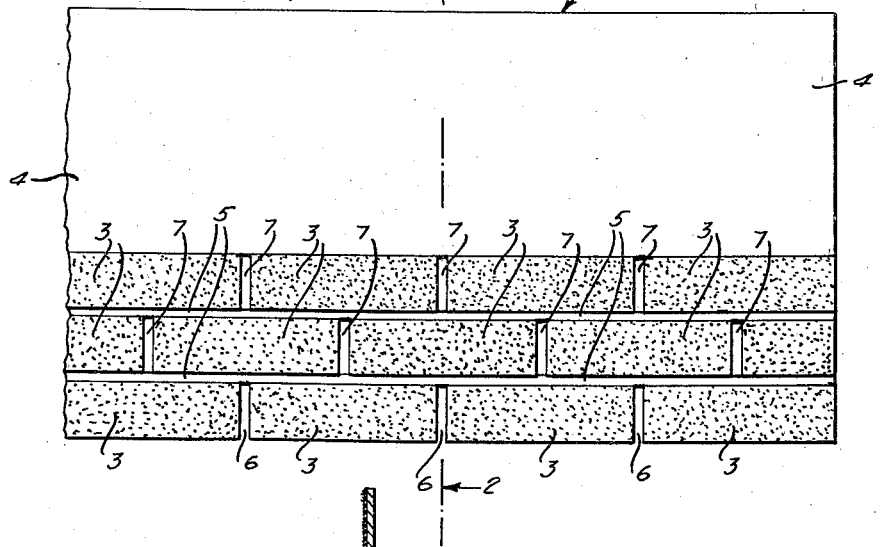
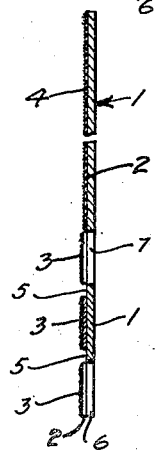
INVENTOR
GEORGE KNAPP
BY Newell + Spencer
ATTORNEY Patented May 24, 1938

2,118,250

UNITED STATES PATENT OFFICE 2,118,250

COVERING MATERIAL

George Knapp, St. Louis, Mo., assignor to Certain-Teed Products Corporation, New York, N. Y., a corporation of Maryland Application January 20, 1933, Serial No. 652,611

13 Claims. (Cl. 20—5)

This invention relates to a covering for laying upon a surface, and more especially upon the surface of walls, to simulate a structure of masonry. The invention relates more particularly to a weatherproof covering in the form of an element or a sheet intended for laying in complementary arrangement to, and preferably in overlapping arrangement with, similar elements or sheets.

Coverings intended to produce a simulation of masonry structures have been proposed heretofore in various forms. Some of these coverings have been in the form of sheets simulating a plurality of courses of bricks. The simulation of the joints in such coverings has been provided by channels embossed in a mastic coating upon the surface of the sheet or by designs printed upon the surface of the sheet. Such forms of coverings are difficult to produce and are not well adapted properly to simulate the masonry structure, particularly the simulation of the joints of the masonry.

It is an object, therefore, of the present invention to provide a covering in which will be simulated a plurality of courses of masonry with the longitudinal joints of the masonry therebetween and in which both the longitudinal and transverse joints will be formed so as to provide a proper simulation of the masonry joints.

It is also an object of the invention to provide a cover sheet carrying a simulation of a plurality of courses of masonry which will cover a relatively large amount of the surface of the structure to be covered and therefore, while being easy to lay, will also be less expensive than when laying individual shingles or shingle strips in arrangements with the intent of simulating masonry. Moreover, the representation of the masonry structure provided by the strip of the invention will be more realistic than it is possible to obtain with such shingles and shingle strips.

According to my invention, I provide a base sheet upon which is applied a granular or mineral surfacing. This surfacing material is so applied to the base sheet as to form like extending areas or stripes which are spaced apart upon the sheet and which provide the areas within which may be simulated the masonry units. Said spaced arrangement provides that a portion of the surface of the base is exposed or appears between said like extending areas or stripes in simulation of the longitudinal joints of the masonry structure. In order to provide the proper simulation of the surface of the longitudinal joints, I may so form the surface upon which said simulation of the longitudinal joint lies as to produce a contrast between said surface and that of the like extending areas or stripes. Said area or stripe simulating the longitudinal joint in some cases may be covered with a granular or mineral material of a character to simulate the surface of masonry joints.

In order to provide the simulation of the transverse joints, according to my invention I form notches or cutouts transversely of said areas or stripes simulating the longitudinal joints, said notches or cutouts separating or dividing said like extending areas or stripes representing the courses of the masonry into areas which simulate the masonry units in the courses separated by the transverse or vertical joints. By using a notch or cutout through the body of the base sheet, I may expose a surface beneath or underlying the covering, which surface may have the characteristics or appearance of the surface of the mortar in the masonry joints and thus may give to the simulation of the transverse or vertical joints of the masonry said characteristic appearance of masonry joints. When the underlying surface of the structure to be covered is of suitable character and similar to that of the simulated longitudinal joint of the masonry upon the cover, the simulation of the transverse or vertical joints as well as of the longitudinal or horizontal joint is given the characteristic appearance of the surface of a masonry joint, that is, of the mortar.

Moreover, when the covering sheets are of such form as to be adapted for laying in overlapping arrangement in courses upon the structure to be covered, I may provide upon the surface of that portion of the base sheet which is to be overlapped a character or surface such as will provide the simulation of the surface of the masonry joint or of the mortar when seen through the cutouts or notches. In said forms of coverings according to my invention I therefore provide adjacent the edge to be exposed of the covering sheet a simulation of a course of masonry units, the simulated units being separated by notches in said edge of the sheet. Adjacent said course of simulated masonry units but separated therefrom by a simulated longitudinal joint, as described above, may be provided a simulation of a second course of masonry units, said simulated units in said course being spaced apart by cutouts through the body of the sheet of such form and dimension as to simulate the transverse joints of the masonry in said second course. Similarly other courses may be provided adjacent said second course. In all cases the simulation of a longitudinal joint of the masonry will be provided upon the base without cuts through the body of the base and exposing a surface having a character adapted to simulate the surface of the mortar in said longitudinal joints. The transverse joints, however, will be simulated by the cutouts or notches through the body of the sheet between the simulated masonry units, and the character of the surface of the mortar for said transverse joints will be provided by the underlying surface exposed through said notches or cutouts.

In order to provide said character of the mortar for said transverse joints, upon the remainder of the covering sheet or upon a sufficient portion of the remainder beyond said simulated masonry courses according to my invention I provide a character of surface which will simulate the character of the surface of mortar when laid in masonry joints. The extent of the area beyond said simulated courses of masonry preferably is sufficient to underlie all the courses of a superimposed and overlapping covering sheet. Preferably when it is necessary to provide a weatherproof and watertight construction in addition to the extent of area necessary to produce the simulation of the transverse joints, said overlapped portion may be of sufficient extent transversely of the longitudinal stripes as to provide the usual "head lap" ordinarily used in such constructions.

My invention will be more fully described in connection with the drawing of which:

Figure 1 shows a face view of a covering sheet according to my invention;

Figure 2 shows a cross section on line 2—2 of Figure 1; and

Figure 3 shows an assembly of the sheets in overlapping arrangement.

In Figure 1 a base sheet such as may be provided by an asphalt coated felt commonly used in roofing materials is indicated by the numeral 1. When such an asphalt impregnated felt is used commonly there is applied thereto a coating of asphalt in order to provide an adhesive upon which to apply granular or mineral material. Broadly my invention is not limited to the particular type of base material nor the adhesive used to cause the mineral surfacing to adhere thereto. The relation of the coating and the surfacing material of the base may be seen from the section in Figure 2, the coating being designated by the numeral 2 and the granular or mineral surfacing by the numerals 3 and 4. The numeral 3 is intended to indicate the granular or mineral surfacing material such as slate as applied to the areas simulating the masonry units, that is, the bricks shown in the figures. The numeral 4 is intended to designate the surfacing applied to the portion of the sheet which is to be overlapped by a covering unit similar to that described. At 5 is indicated the simulation of the longitudinal joint of the masonry, that is, the joint between the two horizontal courses of brick, as shown in the figure. The vertical joints between the lower course of bricks are simulated by the notches 6 and the vertical joints in the second course which, as shown in the figure, are staggered with respect to the joints 5 in order properly to simulate the bricks as usually laid in courses are shown at 7. These joints, as described above, are provided by cutouts in the base sheet, that is, in the felt 1.

By applying to the portion of the covering to be overlapped a surfacing 4 of contrasting color or shade to that which is applied upon the portion to be exposed, that is, to the areas 3 simulating the masonry units or bricks, the masonry units in each course appear properly separated by the transverse masonry joints, that is, the vertical brick joints, when said surfacing 4 is seen through the notches or cutouts of a covering sheet or element overlapping upon said surfacing 4. By suitably choosing the shade or color as well as the character of the granular material, the appearance of the mortar joints may be effectively simulated.

While according to my invention I may provide the simulation of the longitudinal joint of the masonry, such as the horizontal joint of brickwork, in any suitable manner, I prefer to form this joint, especially in asphalt coated felt base coverings, by scraping the asphalt coating along the line or lines of the longitudinal joints according to the method disclosed in the patent to Outman 1,426,497. According to this method, a portion of the asphalt coating is removed which prevents the relatively coarse granular material or slate applied to the areas simulating the masonry units or bricks adhering to the coating in the groove. In this manner I may provide the contrast necessary between the masonry units and the joint. The character of the groove scraped according to the patent to Outman is such that I thus may also provide a simulation of the surface of mortar joints when black mortar is used. However, I may apply to the scraped joint of Outman a fine granular material capable of adhering to the coating remaining in the groove, thus to present the appearance of the surface of the mortar. I may also use the method of Outman as well as the method of applying fine granular material to the portion of the sheet to be overlapped and covered by the surfacing 4 as described above. Of course I may form the grooves by other methods, including those which have been used to form channels in coatings upon sheets as has been heretofore suggested.

The invention is not limited to a particular kind of base sheet material but is especially adaptable to felt base and asphalt coated roofing materials. Moreover, the invention is not limited to the particular type of masonry structure illustrated in the figures. Within the scope of my invention, I may form the covering sheet so as to produce a simulation of other types of masonry while embodying the features of the invention, namely, the combination of the longitudinal joint simulated upon the surface of a base without cuts through the base and the simulation of the transverse joint by cutouts or notches through the base, especially to expose through said cutouts or notches an underlying surface having the character of the surface of a mortar joint.

What is claimed is:

1. A covering for laying upon a surface, comprising a base having a portion of the surface thereof demarked by a continuous stripe thereacross into a plurality of longitudinally extending surfaces, said continuous stripe being formed to simulate a longitudinal mortar joint between courses of masonry units, said longitudinally extending surfaces being divided by cutouts in the base into areas simulating the masonry units in courses separated by transverse masonry joints.

2. A covering for laying upon a surface comprising a base upon which is simulated a plurality of courses of masonry units, said simulated masonry units being provided by discontinuous longitudinal transversely spaced stripes having a surface character simulating the masonry units, said discontinuous stripes being separated by continuous longitudinal stripes having a surface of a character contrasting with that of said discontinuous stripes to simulate the longitudinal joints of masonry, said covering having cuts therein extending transversely of said continuous longitudinal stripes and dividing said discontinuous stripes into a series of areas simulating the masonry units, said cuts being so formed as to simulate the transverse joints of the masonry.

3. A covering for laying upon a surface comprising a base sheet, discontinuous spaced parallel longitudinally extending stripes upon said base and exposing continuous longitudinal stripes between said discontinuous longitudinally extending stripes, said sheet having a discontinuous stripe adjacent one longitudinal edge of said sheet divided into a longitudinal series of areas simulating units of masonry by notches in said base extending transversely of said edge, the remaining longitudinal discontinuous stripes being divided into longitudinal series of areas simulating units of masonry by cutouts in the base sheet.

4. A covering for laying upon a surface comprising a base, mineral surfacing material of given color carried upon said base, discontinuous spaced parallel stripes of mineral surfacing material of contrasting shade or color carried upon said base and exposing between said stripes parallel stripes of the mineral surfacing of given color, said covering having a discontinuous stripe adjacent one longitudinal edge of the base divided into a longitudinal series of areas simulating units of masonry by notches in said base extending transversely of said edge, the remainder of said discontinuous stripes being divided into longitudinal series of areas simulating units of masonry by cutouts in said base.

5. A covering strip for laying upon a surface having an asphalt saturated felt base with a slate surfacing covering said base and providing discontinuous horizontal and parallel stripes of similar shade or color vertically spaced by continuous stripes of shade or color contrasting with said discontinuous stripes so as to simulate horizontal mortar lines, each of said discontinuous stripes being divided in a series of brick appearing elements by vertical cutouts simulating vertical mortar lines between horizontally adjacent brick appearing elements.

6. In a building construction, a supporting surface and building strips attached thereto, each of said strips having an asphalt-saturated felt base with a slate surfacing covering said base and providing discontinuous horizontal and parallel vertically-spaced stripes of similar shade or color, said stripes being vertically spaced by continuous stripes of shade or color contrasting with said discontinuous stripes so as to simulate horizontal mortar lines, each of said discontinuous stripes being divided into a series of brick appearing elements by vertical cutouts simulating vertical mortar lines between horizontally adjacent brick appearing elements.

7. A covering according to claim 3 for laying upon the surface in overlapping longitudinal courses, said covering being so formed as to provide between the discontinuous longitudinal stripe most remote from said longitudinal edge to be exposed of said sheet and the longitudinal edge of said sheet remote from said edge to be exposed an area of the surface of the sheet of contrasting color to said discontinuous longitudinal stripe, said surface of contrasting color being so related to the remaining areas of the sheet that said contrasting color upon a sheet in an underlying course may become exposed between the masonry units to simulate the mortar joints.

8. A construction for covering a surface, comprising a plurality of sheets of covering material having demarked upon a portion of the surface of each sheet a plurality of courses of masonry by spaced continuous stripes extending longitudinally of the sheet to simulate the longitudinal joints of masonry, said continuous stripes separating portions of the surface of the sheets of contrasting character to said stripes, said portions being divided into longitudinally extending series of areas simulating units of masonry by cutouts in the sheet of such dimension as to simulate the transverse joints of the masonry, said sheets being arranged upon the surface with respect to each other with the longitudinal stripes thereof like-extending and with the cutouts of adjacent sheets in such arrangement with respect to each other longitudinally of the stripes as to simulate the joints of the masonry.

9. A building element having a plurality of spaced bands of predetermined color on a face thereof, and a row of slots located in each of said bands transversely thereof, said rows and said bands being spaced by a band of a different color and of defined outline demarking said bands of predetermined color upon the element.

10. A building element having a longitudinal extent and having a plurality of spaced longitudinal bands of predetermined color on a face thereof, and a row of slots located in each of said bands transversely thereof, said rows being spaced by a longitudinal band of a different color and of defined outline and demarking said bands of predetermined color upon the element, said slots in adjacent rows being staggered in relation to each other.

11. A building element comprising a base having a plurality of like-extending rows of spaced slots therein with slots in at least one of said rows located entirely within the limiting boundaries of the element, said rows of slots being located in bands of predetermined color with the slots transversely thereof, said bands alternating with bands of color differing from that of said first mentioned bands, said bands of different color being of defined outline demarking said bands of predetermined color upon the base.

12. A covering for a surface in simulation of courses of masonry units with masonry joints therebetween comprising a plurality of covering elements laid in courses with portions of the elements in one course overlapping upon portions of the elements of the subjacent course, said elements having upon the portions thereof exposed in the course a plurality of discontinuous stripes extending coursewise of the elements and spaced transversely of the coursewise direction by continuous stripes contrasting to said discontinuous stripes and formed to simulate the longitudinal masonry joints, said discontinuous form of said discontinuous stripes being provided by cut-outs transversely of said stripes positioned and formed to simulate the transverse joints of the masonry, said elements having a discontinuous stripe along the exposed coursewise edge thereof divided by cut-outs formed as notches extending from said edge, said elements being laid with said exposed coursewise edge thereof overlapping upon but exposing a portion of the subjacent course as a continuous stripe contrasting to said discontinuous stripes and spacing the discontinuous stripe along said overlapping coursewise edge from a discontinuous stripe on the subjacent course to simulate a longitudinal joint of the masonry, the portion of the elements overlapped by an overlapping course having an extent to underlie the cut-outs of said overlapping element and contrasting with the discontinuous stripes to simulate through said cutouts and notches the transverse joints of the masonry.

13. A building element having a plurality of spaced bands of predetermined surface character upon a face thereof, and a row of slots located in each of said bands transversely thereof, said bands being spaced by a band having the surface thereof depressed below and being of defined outline demarking said bands of predetermined surface character upon the element.

GEORGE KNAPP.